Patented Sept. 2, 1947

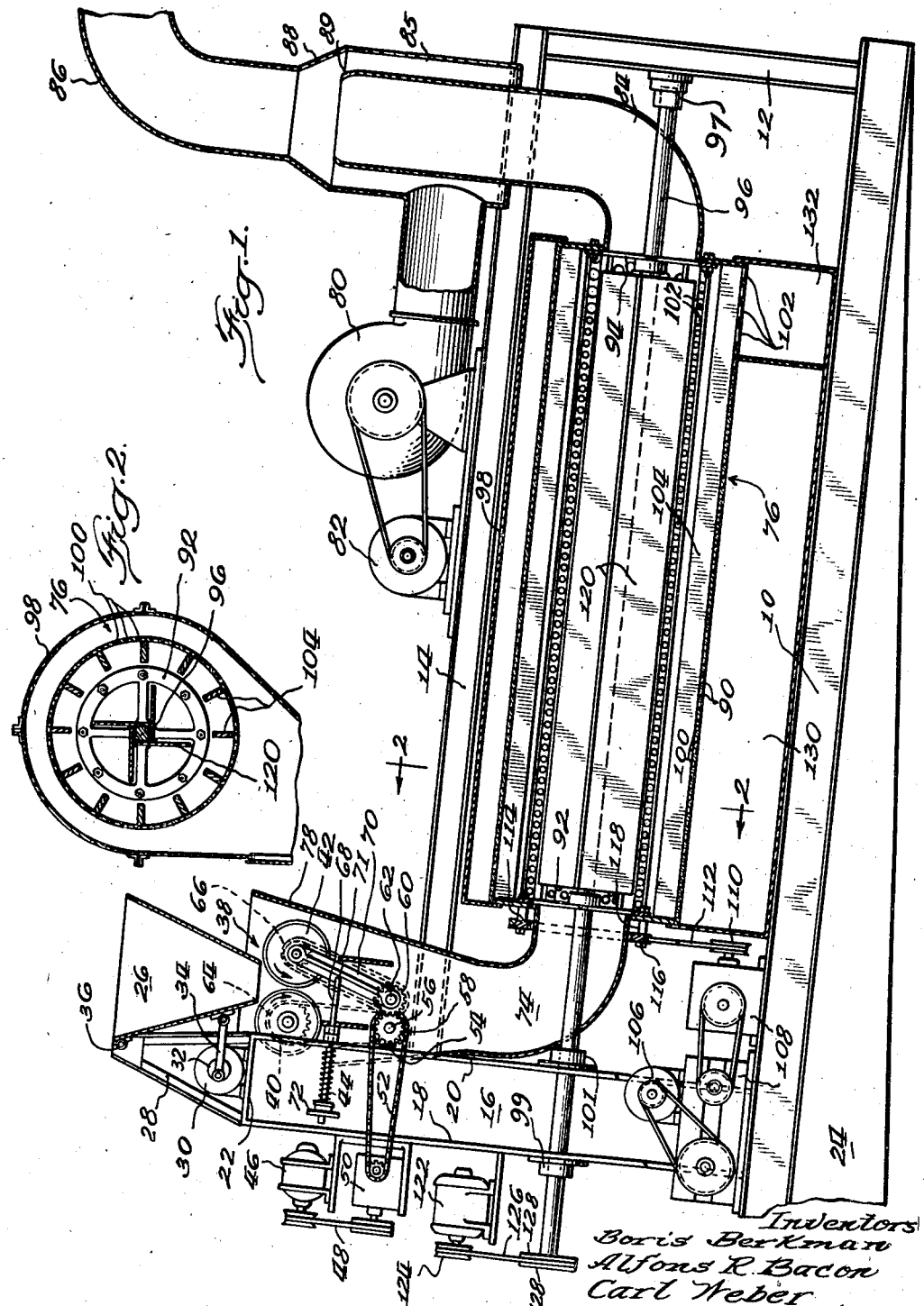

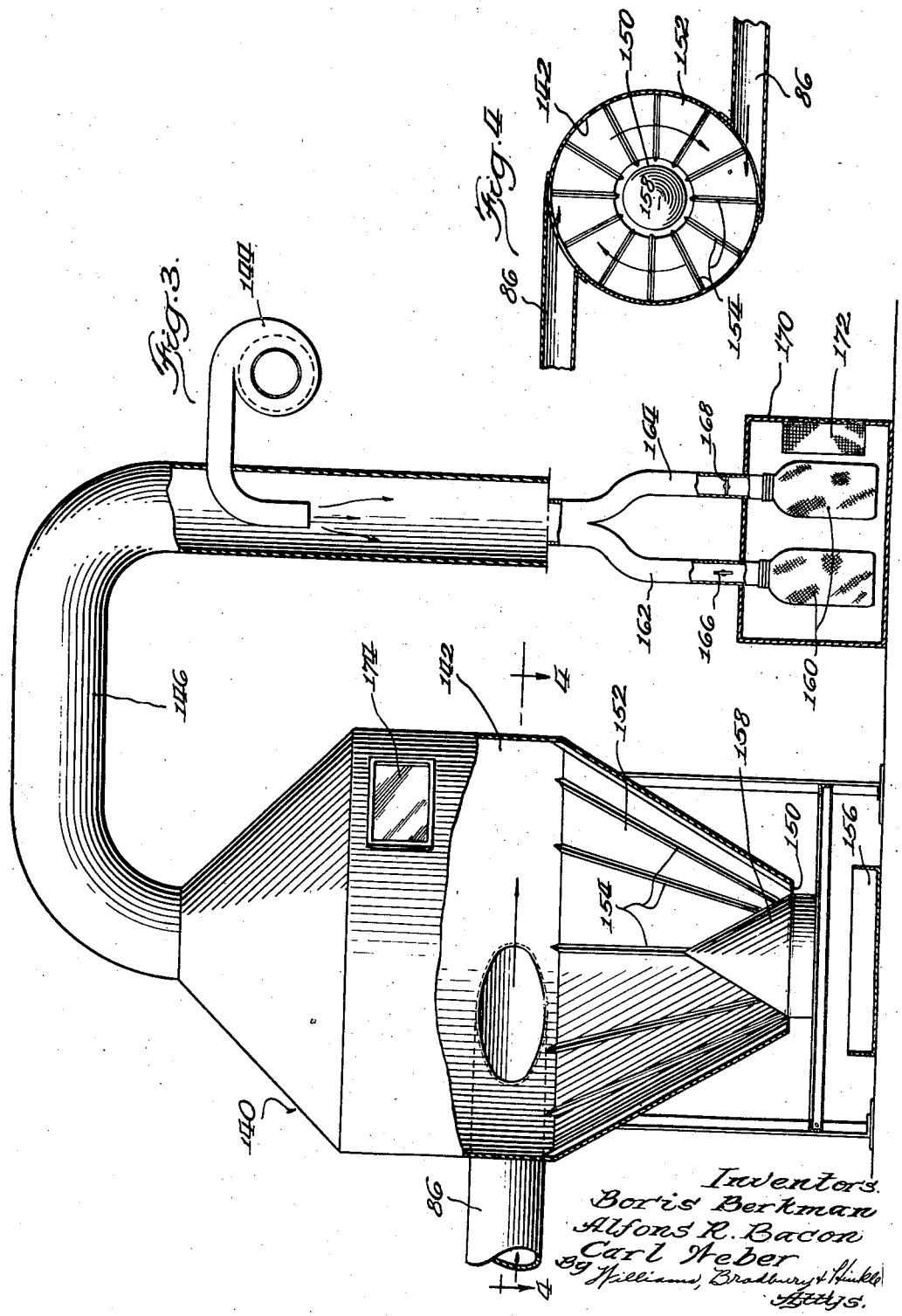

2,426,813

UNITED STATES PATENT OFFICE 2,426,813

MILKWEED GIN

Boris Berkman, Appleton, Wis., and Alfons R. Bacon and Carl Weber, Chicago, Ill., assignors to Milkweed Products Development Corporation, Chicago, Ill., a corporation of Illinois Original application June 19, 1942, Serial No. 447,626, now Patent No. 2,375,187, dated May 8, 1945. Divided and this application April 29, 1944, Serial No. 533,300

2 Claims. (Cl. 19—90)

Our invention relates to an improved mechanism for separating milkweed or kapok pods into their several components and isolating these components. This application is a division of our copending application, Serial No. 447,626, filed June 19, 1942, now Patent No. 2,375,187, granted May 8, 1945, and relates specifically to the rotary separator for the milkweed gin.

As explained in the copending application of Boris Berkman, Serial No. 445,380, filed June 1, 1942, now Pat. No. 2,375,186, granted May 8, 1945, milkweed and kapok pods are similar in many respects, and, in the interest of simplicity, the term "milkweed" will be used in referring to both milkweed and kapok plants and component parts of these plants.

The floss fibers of these plants are extremely delicate and, therefore, easily damaged during the ginning operation. For this reason, among others, commercially feasible milkweed gins have not heretofore appeared. As explained in the above mentioned copending application, it has been found that if the pre-dried pods are crushed somewhat before being opened, slight relative movement between the seeds and the attached floss clusters occurs, and this movement is sufficient to break the brittle necks joining each of the seeds to its floss cluster, thus effecting a complete separation between the seeds and the floss while both of these components remain within the pod.

It is the principal object of the present invention to provide a novel device for performing the above described method together with associated mechanism for separately collecting the three component parts of the milkweed pod.

It is a further object of the present invention to provide a novel method for separating and collecting the three principal components of milkweed pods.

Another object is to provide a novel milkweed gin in which the separation and collection of floss, seeds and pod shells may be accomplished on a commercial scale.

Yet another object of the present invention is to provide an improved, commercially feasible milkweed gin which accomplishes separation and collection of floss fibers, seeds and pod shells without injury to the floss fibers, and which further effects a substantially perfect separation of the several components.

Yet another object of the present invention is to provide an improved milkweed gin which accomplishes the above mentioned objectives and which is comparatively simple in construction and which takes no particular skill to operate.

Yet another object of the present invention is to provide a novel milkweed gin capable of accomplishing the above objectives and which collects the floss fibers in a substantially pure condition, unadulterated by pod, placenta, or seed particles, occasional seeds, or other refuse material.

Other objects and advantages will appear from the following description of a preferred embodiment of our invention, taken in conjunction with the accompanying drawings, in which:

Fig. 1 is a substantially medial sectional view through a portion of the mechanism comprising the present invention;

Fig. 2 is a sectional view of a portion of the mechanism illustrated in Fig. 1, and may be considered as being taken in the direction of the arrows along the line 2—2 of Fig. 1;

Fig. 3 is a partial sectional view of an additional portion of the mechanism comprising the present invention, the mechanism illustrated in Fig. 3 being connected to the mechanism shown in Fig. 1, as will be described presently; and Fig. 4 is a horizontal sectional view of a portion of the mechanism illustrated in Fig. 3, and may be considered as taken along the line 4—4 of Fig. 3 looking downwardly as indicated by the arrows.

In Fig. 1 there is illustrated a portion of a preferred embodiment of our invention, showing the cooperative relationship of a set of crushing rollers and a rotary separator. The gin is mounted on a steel frame comprising base members 10, end standard 12, and a top frame member 14. At the left end of the gin is a mounting 16 comprising two uprights 18 and 20 and a top member 22, the top frame member 14 being supported by the upright 20. The whole frame is tilted slightly by elevating the left end upon the block 24.

A feed hopper 26 is pivotally mounted at 36 on the upper end of an inverted V support 28. Hopper 26 is continuously agitated by a motor 30, through eccentric 32 and link 34, link 34 being attached to the hopper 26 near its lower end.

The pods are fed into the top of hopper 26 by any convenient method, such as by a conveyor belt system. The continuous vibratory motion of the hopper 26 prevents the pods from clogging at the mouth and insures an even feed of pods to the crushing mechanism 38.

As the pods drop from the hopper 26, they fall between a pair of rollers 40—42, which are biased toward each other by springs 44. The rollers 40—42 are driven by motor 46 through pulley 48, gear reduction drive 50, chain drive 52 and sprocket 54. Sprocket 54 is keyed to shaft 56 as is gear 58. Gear 58 is in constant mesh with gear 60, which is keyed to shaft 62. Shafts 56 and 62 are journaled in bearings, not shown, which are mounted on the upright 20.

Shafts 56 and 62 thus are driven at the same speed. Also keyed to shafts 56 and 62 are a pair of sprockets (not shown) which drive sprockets 64 and 66, respectively, which drive rollers 40 and 42, respectively. Sprocket 64 has a diameter about 1½ times that of sprocket 66, so that roller 42 is driven at a circumferential velocity about 1½ times that of roller 40. It has been found that speeds of 12 R. P. M. and 8 R. P. M., respectively, work very satisfactorily. The speeds are not critical, however, the above figures being given for purposes of illustration only.

Rollers 40 and 42 are covered with a layer of rubber which is somewhat resilient so that the surface of the roller may conform partially to the shape of the pod. This action prevents the pods from sliding on the surface of the roller or from popping out from between the rollers. As the pods pass between the rollers, they are crushed slightly due to the pressure exerted by the spring 44. This spring is mounted on a long bolt 68, pivotally fastened to member 70 at 71. At its lower end, the member 70 is pivotally mounted on shaft 62, while the roller 42 is journaled at its upper end. Spring 44 is compressed between an adjusting nut 72 and the frame member 20. As the pods pass between the crushing rollers, the roller 42 tends to swing away from roller 40. The spring 44 resists this tendency and supplies sufficient pressure to the pods to crush them slightly to impart relative movement between the floss clusters and seeds so as to break the joining necks.

After the pods have passed from between the rollers, they drop into a conduit 74, which leads to the rotary separator 76. The upper end of this conduit ends in a flared portion 78, which extends around and above the crushing rollers 40, 42. Freed floss is borne through the conduit 74 and rotary separator 76 under the influence of an air stream created by blower 80, which is driven by motor 82. The floss is exhausted from the rotary separator 76 into conduit 84. This conduit is surrounded at its other extremity 89 by a conduit 85, which has a restricted portion 88 adjacent the end 89 of conduit 84. The air stream created by blower 80 creates a suction through conduit 84, rotary separator 76 and conduit 74.

The rotary separator 76 comprises a long conduit or drum 90 which is rotatably mounted by means of spiders 92 and 94 on shaft 96 within a housing 98. The shaft 96 is journaled in a bearing 97 on frame member 12 and in bearings 99 and 101 on the support 16. The drum 90 is perforated throughout its major portion with holes 100 about ⅜ inch in diameter through which the separated seeds pass. At the right end, larger holes 102 are provided, through which the empty pod shells may pass. The interior surface of the drum 90 is provided with a number of longitudinal blades 104, which are approximately one-eighth of the diameter of the drum in height and which extend for substantially its whole length.

The drum 90 is driven by motor 106 through compound gear reduction means 108, pulley 110, belt 112 and pulley 114. The pulley 114 is bolted to the end of the drum 90 by the same bolts 116 that fasten the spider 92 to the drum. It is spaced somewhat from the drum 90 by spacers 118.

Within the drum 90, four longitudinally extending blades 120 are mounted upon the shaft 96. These blades are of such size and are so positioned that there is approximately three inches of clearance between them and the blades 104. The blades 120 and shaft 96 are driven by motor 122 through pulley 124, belt 126 and pulley 128.

Both the drum 90 and the blades 120 rotate in the same direction, the blades being driven ten to fifteen times as fast as the drum.

The partially opened pods come from the rollers and pass through the conduit 74 into the rotary separator 76. The cooperative action of the blades 104 and 120 fully break open the pods to release their contents of floss and seeds. As the shells and seeds are heavy, they are not acted upon by the air stream and are thrown against the drum surface. The rotation of the drum sifts the seeds through the holes 100 into the receptacle 130. The slope of the separator and the rotation of the drum carry the empty pod shells to the right end of the drum, where they drop through the holes 102 into receptacle 132.

The conduit 84 has a smaller diameter than the drum 90, so that the separated seeds and pod shells will not enter under the force of gravity. The receptacles 130 and 132 may be cleaned out periodically without the necessity of stopping the machine.

The freed floss and some lightweight refuse, such as pieces of the placenta and seed crumbs, are carried through the separator between the two sets of blades 120 and 104 and through the conduit 84. The floss, plus the lightweight refuse material, passes from the conduit 84 into conduit 86 and thence into the air stream of the blower 80.

The floss is then blown into a cyclone air flotation chamber 140 (Figs. 3 and 4). The conduit 86 enters the main body 142 of the chamber 140 on a tangent at the outer periphery thereof, and creates a circular current of air in the chamber in a horizontal plane. This air current carries the floss and the lightweight refuse material in a circular path within the chamber. The speed of rotation causes the heavier particles, which include everything excepting the floss, to migrate to the outer edge of the current. The lighter floss, however, moves nearer the center of the chamber 140.

A vertical stream of air is induced into the chamber 140 by blower 144, which draws air through conduit 146, which leads from the top of chamber 140. The air stream which is being withdrawn from chamber 140 must be greater than that which enters through the conduit 86. This is necessary to prevent floss from being blown through an opening 150 in the bottom of chamber 140.

It is through the opening 150 that a portion of the vertical air stream is drawn, the remainder and greater part being drawn from the center of the circular current. As the refuse material travels along the wall of chamber 140 out of the vertical air stream, the force of gravity drops it into the lower conical portion 152 of chamber 140. The conical portion 152 is fitted with a plurality of ribs 154. The ribs 154 arrest the travel of seeds and impurities and break loose any floss fibers which might be clinging to it. Substantially completely freed of floss, the refuse material drops through the opening 150 into a collecting receptacle 156.

The opening 150 is partially closed by a conical plug 158 to restrict the available usable area of opening 150 to a narrow circle which aids in properly positioning the vertical air stream so that floss may be selected from the circular path.

As shown in Fig. 4, the cyclone chamber 140 may be served from more than one rotary separator. Fig. 4 shows two conduits 86 leading to two rotary separator units. The number of units that can be handled by a single cyclone chamber is limited only by the size of the chamber and capacity of the exhausting blower 144, which must be able to exhaust air from chamber 140 faster than it can be blown in by all of the rotary separator units.

In order to facilitate observation of the separating action within the cyclone, a window 174 may be provided in the chamber wall.

The completely separated floss in the present instance is collected in cloth bags 160 which are connected to ends 162 and 164 of conduit 146. The conduit 146 is divided into two or more conduits 162, 164, so that the collecting step may be carried out without shutting off the blower 144. To facilitate this step, each conduit 162, 164 is provided with a damper 166, 168, respectively. Thus, damper 166 is shown in open position, in which position it remains while the bag 160 is being filled. Damper 168 is shown in closed position, which prevents passage of floss while a filled bag 160 is being removed and an empty one placed in position. While only two collecting bags are shown, it is to be understood that as many as desired may be used. If desired, of course, the floss may be fed directly to a baling machine, or it may be conveyed through conduits to locations where it is to be processed into finished or semi-finished articles.

To prevent the possible spreading of any floss dust and as a protection in case of accident to any of the collecting bags 160, these bags are enclosed in a housing 170 provided with a door, not shown, and a screen 172.

While we have described a preferred embodiment of our invention, it will be apparent to those skilled in the art that modifications may be made without departing from the spirit and scope of the invention, and we, therefore, wish to be limited only by the scope of the appended claims.

What we claim as new and desire to secure by United States Letters Patent is:

1. In a device of the class described for separating the floss, seeds, and empty pod shells of the milkweed or kapok plants, the combination of an enclosed housing, a drum open at both ends and mounted for rotation within said housing and into which crushed pods are introduced, a plurality of blades mounted on the wall and extending substantially the length of said drum, a second set of blades mounted within said drum but independently thereof, means for rotating said second set of blades at a different speed than said drum, the cooperative action of said blades being adapted for completely opening the pods to empty their contents of floss and seeds, means in said drum to segregate the seeds and empty pod shells for separate collection, and means connected to said housing for passing a current of air therethrough and through said drum to draw off the freed floss from the seeds and pods.

2. In a device of the class described for separating the floss, seeds, and empty pod shells of the milkweed or kapok plants, the combination of an enclosed housing, a drum open at both ends and mounted for rotation within said housing and into which crushed pods are introduced, a plurality of blades mounted on the wall and extending substantially the length of said drum, a second set of blades mounted within said drum but independently thereof, means for rotating said second set of blades at a different speed than said drum, the cooperative action of said blades being adapted for completely opening the pods to empty their contents of floss and seeds, said drum being provided with a multiplicity of small holes through which the seeds may pass, said drum being also provided with a multiplicity of larger holes through which the pod shells may pass, means in said housing for separately collecting said seeds and said pods, and means connected to said housing for passing a current of air therethrough and through said drum to draw off the freed floss from the seeds and pods.

BORIS BERKMAN.
ALFONS R. BACON.
CARL WEBER.

REFERENCES CITED

The following references are of record in the file of this patent:

UNITED STATES PATENTS

| Number | Name | Date |
|---|---|---|
| 263,121 | Daffin et al. | Aug. 22, 1882 |
| 454,525 | Pickles | June 23, 1891 |
| 482,669 | Young | Sept. 13, 1892 |
| 1,514,044 | Harlan | Nov. 4, 1924 |
| 1,930,952 | Green | Oct. 17, 1933 |
| 2,076,420 | Windle | Apr. 6, 1937 |

FOREIGN PATENTS

| Number | Country | Date |
|---|---|---|
| 372 | Great Britain | 1871 |
| 355,936 | Great Britain | Sept. 3, 1931 |